United States Patent
Lorey et al.

(10) Patent No.: US 10,112,512 B2
(45) Date of Patent: Oct. 30, 2018

(54) SUSPENSION DEVICE

(71) Applicant: GRAMMER AG, Amberg (DE)

(72) Inventors: Konstantin Lorey, Schmidgaden (DE);
Florian Schanderl, Schwarzenfeld (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/634,126

(22) Filed: Jun. 27, 2017

(65) Prior Publication Data
US 2018/0001806 A1    Jan. 4, 2018

(30) Foreign Application Priority Data
Jul. 1, 2016    (DE) .......................... 10 2016 112 119

(51) Int. Cl.
*B60N 2/12*    (2006.01)
*B60N 2/50*    (2006.01)
(Continued)

(52) U.S. Cl.
CPC ............... *B60N 2/505* (2013.01); *B60N 2/02* (2013.01); *B60N 2/0232* (2013.01); *B60N 2/502* (2013.01);
(Continued)

(58) Field of Classification Search
CPC ........... B60N 2/502; B60N 2/505; B60N 2/54
(Continued)

(56) References Cited

U.S. PATENT DOCUMENTS 3,826,457 A * 7/1974 Huot de Longchamp .................. B60N 2/502
248/564
3,897,036 A * 7/1975 Nystrom ................ B60N 2/181
248/421

(Continued)

FOREIGN PATENT DOCUMENTS

EP    3178691    6/2017
GB    2243998 A    11/1991
(Continued)

OTHER PUBLICATIONS

Search Report prepared by the German Patent Office dated May 29, 2017, for German Patent Application No. 10 2016 112 119.3.
(Continued)

*Primary Examiner* — Rodney B White
(74) *Attorney, Agent, or Firm* — Sheridan Ross PC

(57) ABSTRACT

Suspension device for a vehicle seat, comprising an upper suspension portion and a lower suspension portion, said suspension portions being connected to one another by a first swivel connector and a second swivel connector, said first swivel connector being arranged on the lower suspension portion in such a way that it can swivel about a first swivel pin, and said second swivel connector being arranged on the lower suspension portion in such a way that it can swivel about a second swivel pin, a first tension spring and a second tension spring being respectively connected to the first swivel connector by means of a first end region and to the upper suspension portion or the lower suspension portion by means of a second end region, wherein the first end region of the first tension spring is attached to the first swivel connector at a first distance therefrom, and the first end region of the second tension spring is attached to the first
(Continued)

swivel connector at a second distance therefrom, the length of the first distance being variable.

5 Claims, 7 Drawing Sheets

(51) Int. Cl.
B60N 2/54 (2006.01)
B60N 2/02 (2006.01)
(52) U.S. Cl.
CPC .............. B60N 2/507 (2013.01); B60N 2/54 (2013.01); B60N 2/544 (2013.01); *B60N 2002/0236* (2013.01)
(58) Field of Classification Search
USPC ........................................ 297/344.15, 344.16
See application file for complete search history.

(56) References Cited

U.S. PATENT DOCUMENTS

| | | | | | |
|---|---|---|---|---|---|
| 3,984,078 | A | * | 10/1976 | Sturhan | B60N 2/502 248/588 |
| 4,125,242 | A | * | 11/1978 | Meiller | A47C 3/22 248/421 |
| 4,195,883 | A | * | 4/1980 | Ronnhult | B60N 2/502 248/564 |
| 4,209,158 | A | * | 6/1980 | Pickles | B60N 2/1615 297/344.15 X |
| 4,213,594 | A | * | 7/1980 | Pietsch | B60N 2/501 248/550 |
| 4,312,491 | A | * | 1/1982 | Aondetto | B60N 2/502 248/575 |
| 4,408,744 | A | * | 10/1983 | Thompson | B60N 2/502 248/429 |
| 4,448,386 | A | * | 5/1984 | Moorhouse | B60N 2/502 248/564 |
| 4,520,986 | A | * | 6/1985 | Liljequist | B60N 2/502 297/344.15 X |
| 4,566,667 | A | * | 1/1986 | Yanagisawa | B60N 2/502 248/421 |
| 4,640,488 | A | * | 2/1987 | Sakamoto | B60N 2/502 108/145 |
| 4,648,578 | A | * | 3/1987 | Sakamoto | B60N 2/502 248/396 |
| 4,714,227 | A | * | 12/1987 | Holm | B60N 2/502 248/550 |
| 4,786,024 | A | * | 11/1988 | Goetz | A47C 3/38 248/157 |
| 4,856,763 | A | * | 8/1989 | Brodersen | B60N 2/502 297/344.16 X |
| 4,913,482 | A | * | 4/1990 | Hanai | B60N 2/501 297/344.16 X |
| 4,941,641 | A | * | 7/1990 | Granzow | B60N 2/501 248/161 |
| 5,014,960 | A | * | 5/1991 | Kimura | B60N 2/502 248/419 |
| 5,222,709 | A | * | 6/1993 | Culley, Jr. | B60N 2/502 248/421 |
| 5,261,724 | A | * | 11/1993 | Meiller | B60N 2/502 297/344.15 X |
| 5,358,305 | A | * | 10/1994 | Kaneko | B60N 2/0224 180/89.14 |
| 5,364,060 | A | * | 11/1994 | Donovan | B60N 2/502 248/421 |
| 5,533,703 | A | * | 7/1996 | Grassl | B60N 2/501 248/421 |
| 5,649,493 | A | * | 7/1997 | Blume | A47B 9/00 297/344.15 X |
| 5,662,367 | A | * | 9/1997 | Rastetter | B60N 2/3097 297/344.15 X |
| 5,794,911 | A | * | 8/1998 | Hill | B60N 2/502 248/419 |
| 5,927,679 | A | * | 7/1999 | Hill | B60N 2/502 297/344.15 X |
| 6,267,344 | B1 | * | 7/2001 | Tateyama | B60N 2/502 248/157 |
| 6,616,116 | B1 | * | 9/2003 | Rochau | B60N 2/501 248/421 |
| 7,032,874 | B2 | * | 4/2006 | Meyers | B60N 2/505 248/421 |
| 7,390,062 | B2 | * | 6/2008 | Hahn | B60N 2/06 297/344.16 X |
| 7,571,886 | B2 | * | 8/2009 | Carter | B60N 2/502 297/344.15 X |
| 7,712,836 | B2 | * | 5/2010 | Deml | B60N 2/501 297/344.16 X |
| 7,810,884 | B2 | * | 10/2010 | Lorey | B60N 2/501 297/344.16 |
| 7,926,769 | B2 | * | 4/2011 | Stenard | B60N 2/4242 297/344.15 X |
| 8,783,772 | B2 | * | 7/2014 | Schuler | B60N 2/502 297/344.15 |
| 9,096,156 | B2 | * | 8/2015 | Wilhelm | B60N 2/501 |
| 2004/0245830 | A1 | * | 12/2004 | Scheck | B60N 2/045 297/344.15 |

FOREIGN PATENT DOCUMENTS

| | | |
|---|---|---|
| JP | S58-12840 A | 1/1983 |
| JP | S60-24634 U | 2/1985 |
| WO | WO 91/04881 | 4/1991 |

OTHER PUBLICATIONS

Extended European Search Report for European Patent Application No. 17175404.7, dated Nov. 17, 2017, 3 pages.

\* cited by examiner

SUSPENSION DEVICE

CROSS-REFERENCE TO RELATED APPLICATIONS

This application claims the benefit of German Patent Application No. DE 10 2016 112 119.3 filed Jul. 1, 2016, the entire contents of which are incorporated herein by reference.

FIELD

The invention relates to a suspension device for a vehicle seat, comprising an upper suspension portion and a lower suspension portion, said suspension portions being connected to one another by a first swivel connector and a second swivel connector, said first swivel connector being arranged on the lower suspension portion in such a way that it can swivel about a first swivel pin, and said second swivel connector being arranged on the lower suspension portion in such a way that it can swivel about a second swivel pin, a first tension spring and a second tension spring being respectively connected to the first swivel connector by means of a first end region and to the upper suspension portion or the lower suspension portion by means of a second end region.

Such suspension devices for vehicle seats are known in the prior art, the upper suspension portion, the lower suspension portion and the swivel connector being arranged in the form of a parallelogram, the first end region of the spring unit being arranged directly on the first swivel connector.

Under these circumstances, the suspension properties of suspension devices can be affected to a significant extent by the weight of the person sitting on the vehicle seat, or in other words whether they are light or heavy. Accordingly, the initial spring tension must be altered in this case to ensure that the suspension properties can be adjusted in line with the weight of the person in question. In particular, it is important to ensure that the suspension device can return the vehicle seat to the original position thereof after compression of the vehicle seat. According to the prior art, only the initial spring tension is used to reset the suspension device or the vehicle seat in such cases.

SUMMARY

Accordingly, the object of the present invention is to provide a suspension device by means of which the suspension device can be adjusted particularly simply and quickly.

This object is achieved by the features described in claim 1. The dependent claims relate to advantageous embodiments of the invention.

The core concept behind the invention is [a] suspension device for a vehicle seat, comprising an upper suspension portion and a lower suspension portion, said suspension portions being connected to one another by a first swivel connector and a second swivel connector, said first swivel connector being arranged on the lower suspension portion in such a way that it can swivel about a first swivel pin, and said second swivel connector being arranged on the lower suspension portion in such a way that it can swivel about a second swivel pin, a first tension spring and a second tension spring being respectively connected to the first swivel connector by means of a first end region and to the upper suspension portion or the lower suspension portion by means of a second end region, wherein the first end region of the first tension spring is attached to the first swivel connector at a first distance therefrom, and the first end region of the second tension spring is attached to the first swivel connector at a second distance therefrom, the length of the first distance being variable.

According to a preferred embodiment, the first swivel connector is connected to the upper suspension portion in such a way that it can swivel about a third swivel pin and the second swivel connector is connected to the upper suspension portion in such a way that it can swivel about a fourth swivel pin.

Such an arrangement generates torques which can be used to return the compressed vehicle seat to the original position or the standard setting or position thereof. The resulting torques are illustrated in greater detail below.

The fact that the first and second tension springs are respectively connected to the first swivel connector by means of the first end region thereof at a distance, the first tension spring being connected at the first distance, and the second tension spring being connected at the second distance, and to the upper suspension portion or the lower suspension portion by means of the second end region thereof respectively, forms a lever arm in each case, a first lever arm for the first tension spring and a second lever arm for the second tension spring, the arrangement of said lever arm being dependent on whether the spring unit is connected to the upper suspension portion or the lower suspension portion by means of the second end region. If the second end region of the tension springs is connected to the upper suspension portion, the lever arm is formed between the third swivel pin and the first end region. If, however, the second end region of the spring unit is connected to the lower suspension portion, the lever arm is formed between the first swivel pin and the first end region.

The following text assumes a connection between the second end region and the upper suspension portion unless otherwise specified. Corresponding relationships apply if the second end region is connected to the lower suspension portion.

By forming the lever arm by arranging the first end region of the tension springs at the corresponding distance from the first swivel connector, said lever arm extending from the first end region of the spring unit to the third swivel point, the spring unit is tensioned when force is applied from outside in such a way that a force is exerted on the lever arm by the spring unit, generating a torque which acts in the opposite direction to the external force application by swiveling the first swivel connector about the first swivel point.

The resulting force generates a torque at the second swivel point via a theoretical lever arm, said theoretical lever arm extending from the second swivel pin perpendicularly to the upper suspension portion.

The torque generated by the theoretical lever arm and the extension of this theoretical lever arm by the specific arrangement of the first swivel pin with respect to the second swivel pin are such that this torque is sufficient to return the suspension device or the vehicle seat to the original position thereof. The torque generated by the theoretical lever arm is not examined in greater detail in the following text.

According to a preferred embodiment, the second distance between the first end region of the second tension spring and the first swivel connector remains constant in this case.

This therefore means that the second tension spring generates a specific minimum torque for the suspension device, said torque being used to reset the suspension device.

The fact that the first distance is variable means that the first lever arm is also variable with the result that the overall torque generated by the first torque of the first tension spring and the second torque of the second tension spring can be adjusted by means of the first tension spring. If a light driver sits on the vehicle seat, a lower overall torque can be selected, which means that the lever arm can be made shorter. However, if a heavy driver sits on the vehicle seat, more torque is required to reset the suspension device. The first lever arm therefore needs to be longer.

According to a particularly preferred embodiment of the invention, the first distance between the first end region of the first tension spring and the first swivel connector can be adjusted by means of an adjustment device, which is connected to the first swivel connector at one end and to the first end region at the other end.

In particular, the lever arm can also be changed by adjusting the first distance, thus changing the extension force or the spring rate of the first tension spring.

According to a further preferred embodiment, the length between the first swivel pin and the third swivel pin, and the length between the second swivel pin and the fourth swivel pin are identical or different.

According to a further preferred embodiment, the length between the first swivel pin and the second swivel pin, and the length between the third swivel pin and the fourth swivel pin are identical.

It is particularly advantageous if the upper suspension portion comprises a vehicle seat, particularly a vehicle seat with a seat portion and a backrest.

According to a preferred embodiment, the suspension device comprises more than two tension springs, or in other words a third, fourth, etc. tension spring in addition to the first and second tension springs, so that the assembled height of the suspension device can be further reduced as a result, since the force applied to the suspension device can be absorbed by two or more springs. The springs can therefore have smaller dimensions as a result. It is particularly advantageous to provide two springs for the suspension device. However, any number of springs, in particular three or more, may also be provided.

In this case, the first and second end regions of the tension springs are preferably the first and second ends of the spring, it being particularly preferable if the first and/or second end of the spring comprises a eyelet or the like so that the tension spring can be easily connected, or in particular hung or suspended using openings or devices provided for this purpose.

The spring rate and the extension force of the suspension device, or in other words the tension spring in particular, are varied by adjusting the first distance of the first end region of the first tension spring and not by changing the spring tension of the spring unit.

In this case, adjustment is equivalent to changing the spatial position of the spring unit or the spring units in the space. By changing the position of the spring unit or the spring in the spring unit, the length of the lever arm acting on the spring unit can be varied.

In particular, the first end region can be adjusted as a result with respect to the lower suspension portion, which can preferably be rigidly connected to a base, chassis or the like, or with respect to the upper suspension portion. In this process, the lever acting on the first tension spring extends from the first swivel connector, or more accurately the third swivel pin, as far as the first end region of the spring unit. It is possible to change the length of the lever by adjusting or displacing the first end region of the first tension spring so that the spring rate and the extension force of the suspension device can be changed as a result. Accordingly, the first end region thus comprises the force transmission point of the first tension spring.

As described briefly above, the extension force is varied as a result of the following relationship. As is known per se, a torque is proportional to the length of a lever if the applied force remains constant. By adjusting the position of the first end region, it is possible to change the length of the first lever arm. If a relatively heavy driver sits on the vehicle seat, which is equipped with the suspension device according to the invention, the lever must be correspondingly longer than in the case of a light driver.

Since, according to the invention, the spring tension is not altered to change the extension force, but rather merely the position of the spring unit is altered, it is merely necessary for the user to apply light force to change the extension force of the suspension device. As a result, it is also possible to adjust the extension force very quickly.

According to a particularly preferred embodiment, the first distance can be adjusted particularly easily if the adjustment device comprises a first and a second support element, said support elements being rigidly connected to the first swivel connector, a spindle element that can be rotated about the first axis of rotation, said spindle element being connected to a first spindle bearing and a second spindle bearing, said first spindle bearing being connected in a stationary manner to the first and second support elements, and said second spindle bearing being connected to an adjustment member that can be rotated about a second axis of rotation, said second axis of rotation being mounted in such a way that it can rotate on the first and second support element, and the first end region of the first tension spring being connected to the adjustment member, and the first end region of the second tension spring being connected to the first support element.

This represents a simple structural means of adjusting the first distance or the first lever arm accordingly in a simple manner.

According to a further preferred embodiment, the adjustment device can be actuated by means of an actuating member, said member being connected to the spindle element, by rotating the actuating member about the first axis of rotation, thus allowing the adjustment member to be rotated about the second axis of rotation.

Alternatively, it is also conceivable to actuate the spindle element by a motor, particularly an electric motor, to rotate the adjustment member about the second axis of rotation and thus vary the first distance.

Further advantageous embodiments are described in the dependent claims.

BRIEF DESCRIPTION OF THE DRAWINGS

Further aims, advantages and expedient uses of the present invention can be found below based on the description in conjunction with the drawings, in which.

In the drawings, like components are to be provided with corresponding reference numerals in each case. For the sake of greater clarity, components may not have a reference numeral in some drawings, although these are numbered elsewhere.

DETAILED DESCRIPTION

Figure 1:
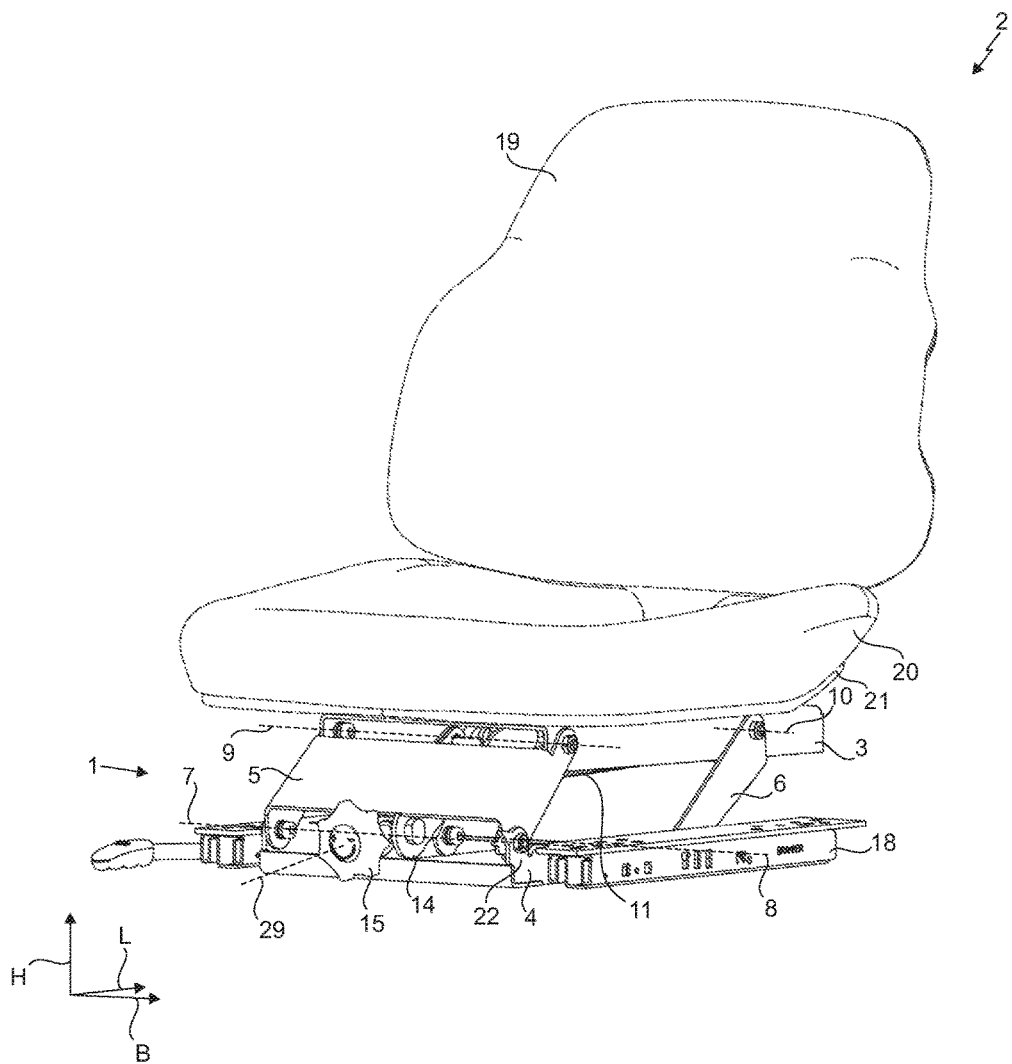
FIG. 1 is a perspective view of a vehicle seat with a suspension device according to a preferred embodiment.

FIG. 1 shows a suspension device 1 for a vehicle seat 2 according to a preferred embodiment. In this case, the suspension device 1 is arranged between an upper suspension portion 3 and a lower suspension portion 4, the upper suspension portion 3 comprising a backrest 19, a seat surface 20 and a seat shell 21. The lower suspension portion 4 is in this case connected to a length adjustment device 18 so that the entire vehicle seat 2 can be displaced in a longitudinal direction L.

As is also evident, the upper suspension portion 3 and the lower suspension portion 4 are connected to one another by a first 5 and a second swivel connector 6, said first swivel connector 5 being connected to the lower suspension portion 4 in such a way that it can swivel about a first swivel pin 7 and to the upper suspension portion 3 in such a way that it can swivel about a third swivel pin 9. The second swivel connector 6 is connected to the lower suspension portion 4 in such a way that it can swivel about a second swivel pin 8 and to the upper suspension portion 3 in such a way that it can swivel about a fourth swivel pin 10.

Furthermore, the first swivel pin 7 is preferably arranged above the second swivel pin 8 when viewed in the vertical direction H. This height difference is achieved by an upwards extending portion 22 to which the first swivel connector 5 is connected by means of the first swivel pin 7.

In addition, the first 11 and the second tension spring 11' are connected to the first swivel connector 5 by means of an adjustment device 14 so that the first end region 12 of the first tension spring 11 is arranged at a first distance 16, and the first end region 12' of the second tension spring 11' is arranged at a second distance 17 therefrom. This is also shown in greater detail in the following drawings.

The adjustment device 14 can in this case be actuated by manual and mechanical means using an actuating member 15, which is mounted in such a way that it can rotate about an axis of rotation 27 and in such a way that the first distance 16 can be changed or adjusted by the rotation D of the actuating member 15, causing the extension force or spring rate of the first tension spring 11 to change.

Figure 2:
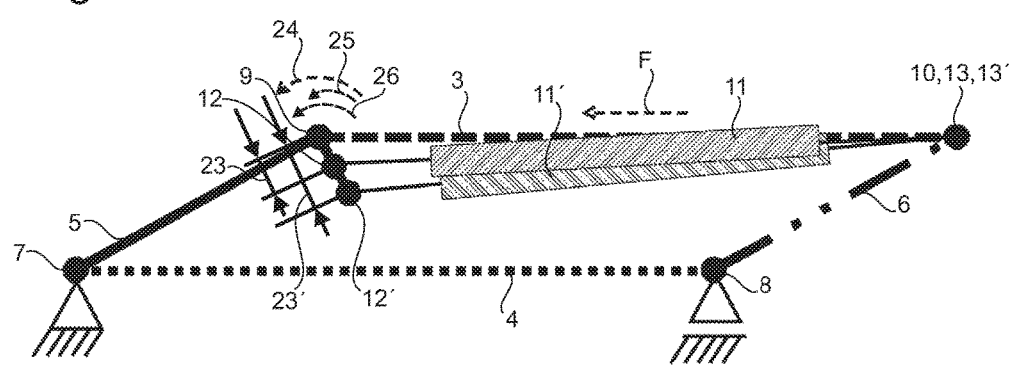
FIG. 2 is a schematic view of the operating principle behind the suspension device.

FIG. 2 shows and explains the operating principle behind the present invention in a schematic view.

In this case, the first end regions 12, 12' of the tension springs 11, 11' are connected to the first swivel connector 5 at a distance from the first swivel connector 5, the first 16 and the second distance 17 extending from the third swivel pin to the respective first end region 11, 11' and representing a lever arm in each case, in particular, a first lever arm 23 for the first tension spring 11 and a second lever arm 23' for the second tension spring 11'.

The force applied by the tension springs 11, 11' generates a torque 24, a first torque 25 being generated by the first lever arm 23 and the force of the first tension spring 11, and a second torque 26 being generated by the second lever arm 23' and the force of the second tension spring 11'.

According to the present embodiment, the second lever arm 23' has a constant length in this case, or, in other words, the second distance 17, corresponding to the second lever arm 23', is constant, and the length of the second distance 17 or the second lever arm 23' is greater than zero.

However, according to a further embodiment, it is also conceivable for the length of the second distance 17 to be variable, corresponding to the first distance. The second tension spring 11' therefore provides a minimum torque for the suspension device 1 under these circumstances, whereas the first torque 25 generated by the first lever arm 23 is dependent on the length of the first lever arm 23.

As a general rule, the longer the first lever arm 23, the higher the first torque 25 generated. The length of the first lever arm 23 can be adjusted continuously by means of the adjustment device 14 (not illustrated here), and in particular the length may be zero or close to zero if the first end region 12 is on the same line as the third swivel pin 9. If the length of the first lever arm 23 is zero or close to zero, then the first torque 25 generated in this case is zero or negligible. This adjustment of the first tension spring corresponds to a configuration with a light driver, as a large torque 24 is not required to reset the seat in this case.

The first end region 12 of the first tension spring 11 can preferably be varied continuously in this case in such a way that the length of the first lever arm 23 can assume values between zero or close to zero and the length of the second lever arm 23'. The longer the first lever arm 23, the higher the first torque 25 generated. If the length of the first lever arm 23 corresponds to the length of the second lever arm 23', the generated torque 24 is at its maximum. It is also conceivable that the first lever arm 23 may be longer than the second lever arm 23', allowing an even higher first torque 25 to be generated. Overall, the length of the first lever arm 23 is restricted by a minimum height of the spring system or the suspension device. The minimum height is present in the fully compressed state.

Figure 3A:
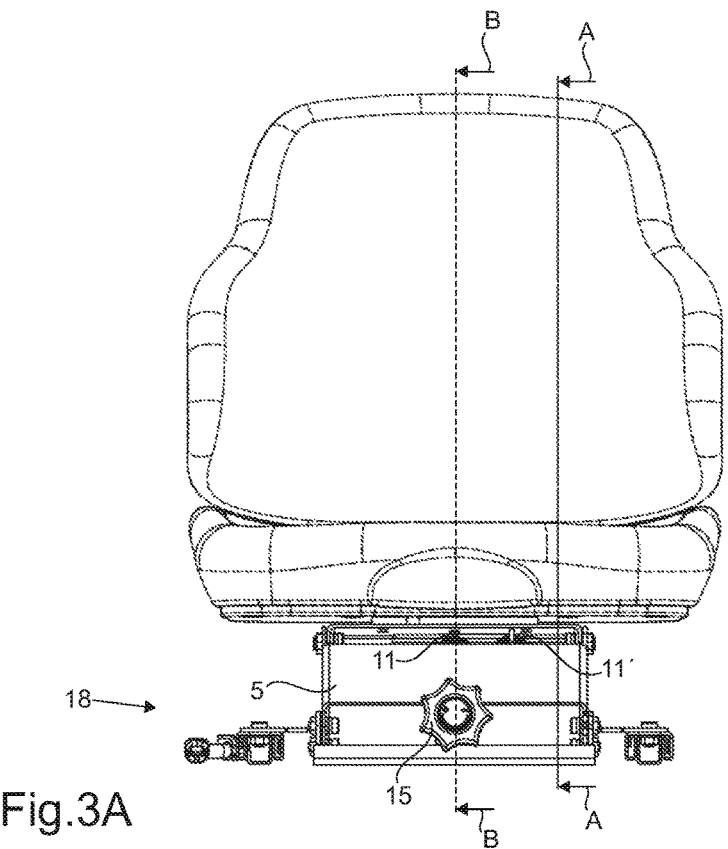
FIG. 3A is a front view of the vehicle seat according to FIG. 1.
Figure 3B:
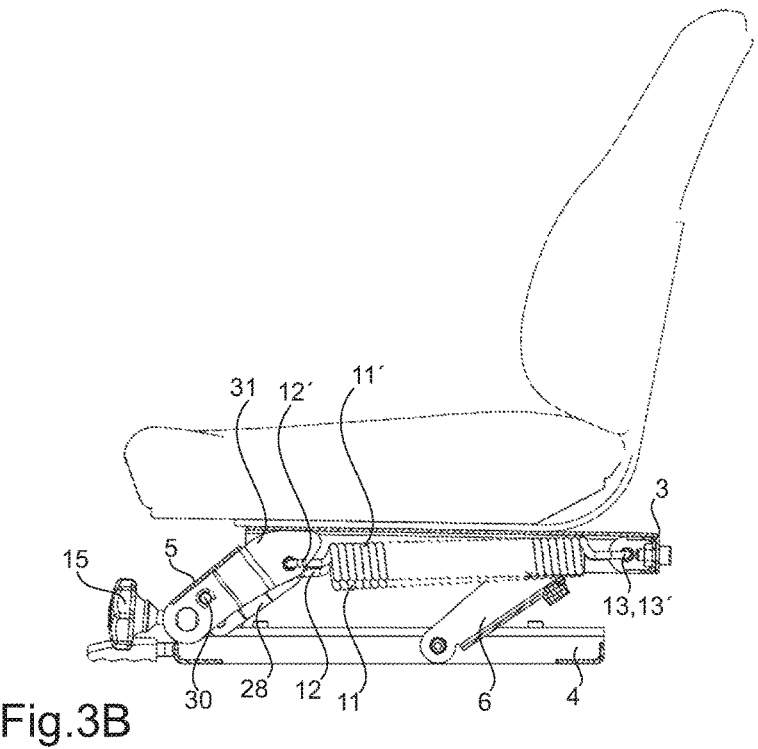
FIG. 3B is a sectional view along the plane A-A of the vehicle seat according to FIG. 3A.

FIG. 3A is a front view of the vehicle seat 2 illustrated in FIG. 1, whereas FIG. 3B shows the vehicle seat 2 in a sectional view along the sectional plane A-A.

As is also evident in FIG. 3B, the first end region 12' of the second tension spring 11' is connected to the first swivel connector 5 by means of a first support element 31 of the adjustment device 14, said first support element 31 being rigidly connected to the first swivel connector 5. The first tension spring 11 is connected to the first support element 31 by means of an adjustment member 28 in such a way that it can rotate about a second axis of rotation 30. The second end regions 13, 13' of the tension springs 11, 11' are connected to the upper suspension portion 3 in this case.

Figure 3C:
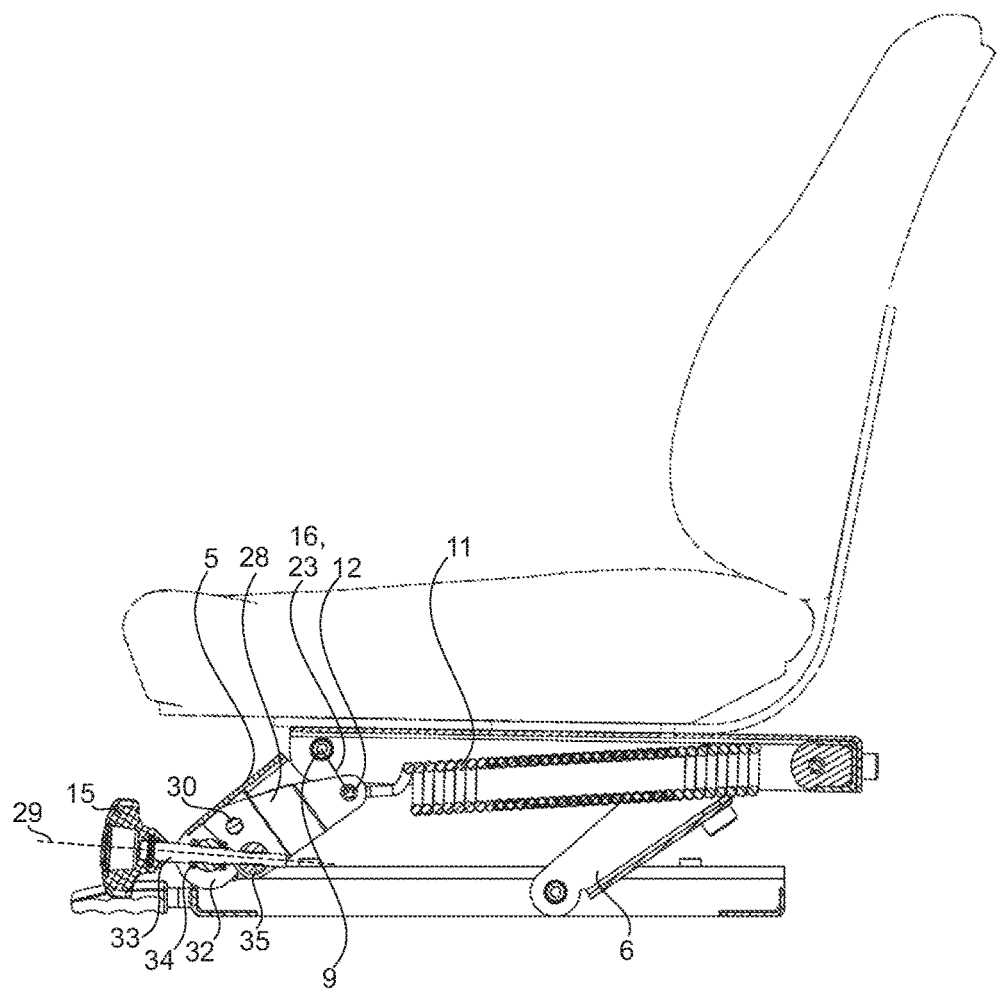
FIG. 3C is a sectional view along the plane B-B of the vehicle seat according to FIG. 3A.

FIG. 3C shows a more detailed view of the adjustment member 28, corresponding to a section along the plane B-B.

A spindle element 33 is connected to the actuating lever 15, said spindle element being able to rotate about a first axis of rotation 29 and being connected to a first spindle bearing 34 and a second spindle bearing 35. The first spindle bearing 34 is in this case arranged in a stationary manner on the first support element 31 (not illustrated here). The second spindle bearing 35 is arranged in a stationary manner on the adjustment member 28 with the exception of possible rotations.

By rotating the actuating lever 15, resulting in a rotation of the spindle element 33 about the first axis of rotation 29, the second spindle bearing 35 is moved along the first axis of rotation 29 and accordingly rotates the adjustment member 28 about the second axis of rotation 30, corresponding to a change in the first distance 16 or the first lever arm 23.

Figure 4A:
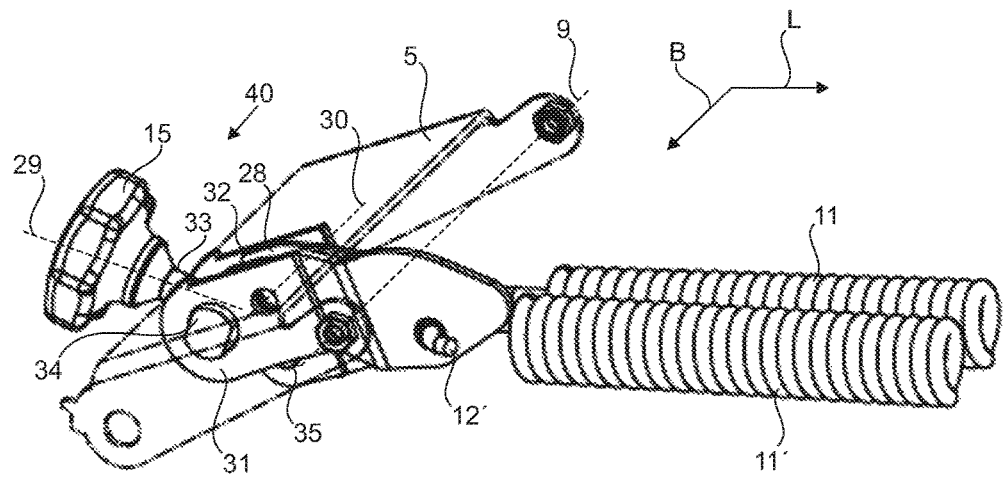
FIG. 4A is a perspective view of the adjustment device for a heavy driver.
Figure 4B:
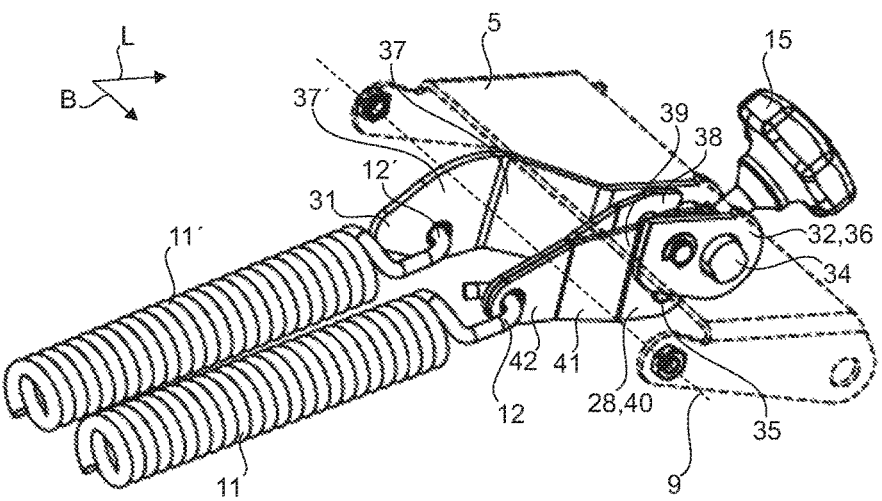
FIG. 4B is a further perspective view of the adjustment device for a heavy driver.
Figure 4C:
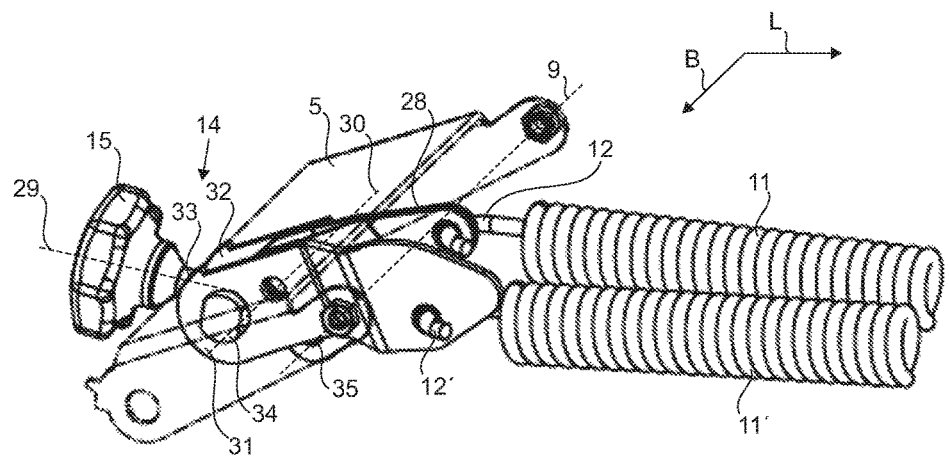
FIG. 4C is a perspective view of the adjustment device for a light driver.
Figure 4D:
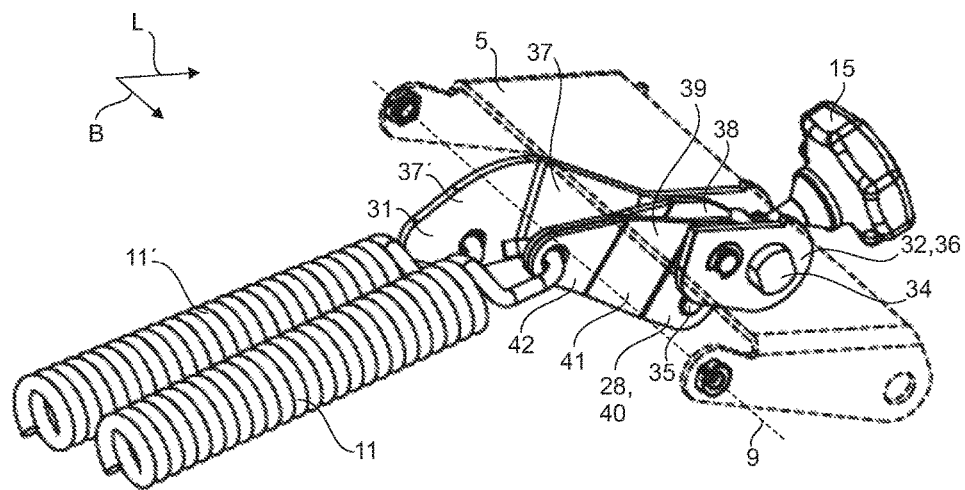
FIG. 4D is a further perspective view of the adjustment device for a light driver.

FIGS. 4A, 4B, 4C and 4D show the adjustment device 14 in greater detail, FIGS. 4A and 4B corresponding to an adjustment for a heavy driver, and FIGS. 4C and 4D corresponding to an adjustment for a light driver. The subject of FIG. 4B corresponds to the subject of FIG. 4A, and the subject of FIG. 4D corresponds to the subject of FIG. 4C, although a different perspective view is shown in each case.

As is evident, the adjustment device 14 is rigidly connected to the first swivel connector 5 by the first 31 and second support element 32. Furthermore, a first spindle bearing is connected both to the first 31 and the second support element 32 in a stationary manner and also to a spindle element 33, said spindle element being mounted in such a way that it can rotate about the first axis of rotation 29. By rotating the spindle element 33 about the first axis of rotation 29, as already described, the second spindle bearing 35 moves along the first axis of rotation 29, leading to a rotation of the adjustment member 28 about the second axis of rotation 30. As a result, the position of the first end region 12 of the first tension spring 11 is altered, which in turn corresponds to a change in the first distance 16 or the first lever arm 23.

As is also evident, the first 31 and the second support element 32 have different designs. However, the support elements 31, 32 advantageously have an identical portion 36, which substantially corresponds to the second support element 32.

However, the first support element 31 also has an intermediate portion 37 and an end portion 38. The end portion 38 extends in parallel with the identical portion 36, but is displaced relative to the portion 36 in the horizontal direction B, the intermediate portion 37 being arranged between the portion 36 and the end portion 38. The intermediate portion 37 extends both in the horizontal direction B and in the longitudinal direction L. It is possible to create a distance between the first end regions 12, 12' in the horizontal direction B by such an arrangement or configuration of the first support element 31 so that the tension springs 11, 11' do not catch on or obstruct one another other when adjusting the first distance 16 (not illustrated here).

FIG. 4A-4D also show that the adjustment member 28 comprises different portions 40, 41, 42. In particular, there is a first adjustment member part 38 and a second adjustment member part 39, said parts being at a distance from one another in the horizontal direction B in a first portion 40. In a second portion 41, the distance between the adjustment member parts 38, 39 in the horizontal direction is reduced constantly when viewed in the longitudinal direction L, whereas the adjustment member parts 38, 39 are connected to one another in a third portion 42.

As shown in FIG. 4B in particular, the first end region 12 of the first tension spring 11 is arranged approximately on the third swivel pin 9 in such a way that the first lever arm 23 (not illustrated here) has a length close to zero, as a result of which no noticeable first torque 25 is generated by the first tension spring 11.

FIG. 5A-5D show a vehicle seat 2 with an adjustment device 14 according to FIGS. 4A and 4B in an upper and a lower end position.

Figure 5A:
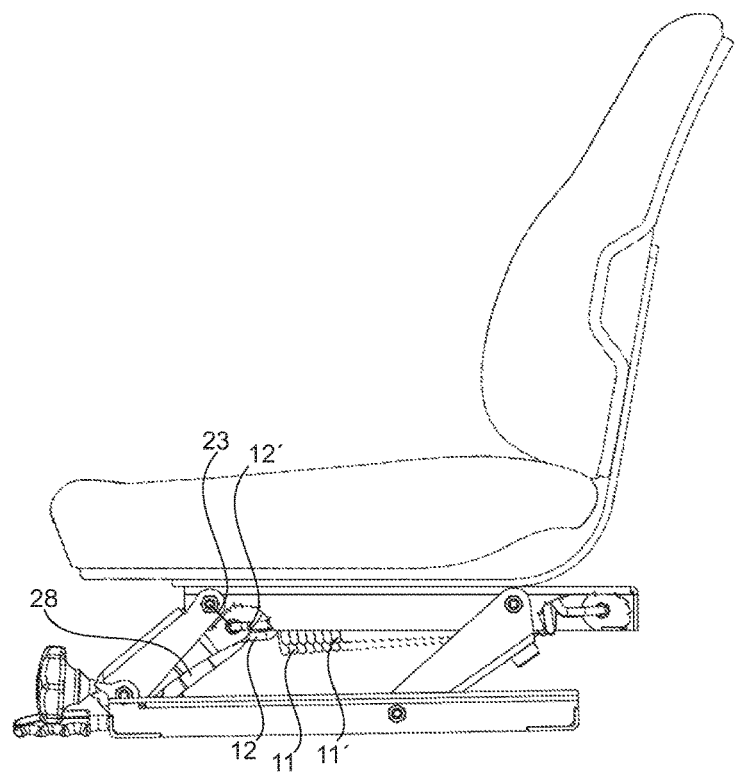
FIG. 5A is a side view of the vehicle seat in an upper end position for a heavy driver.
Figure 5B:
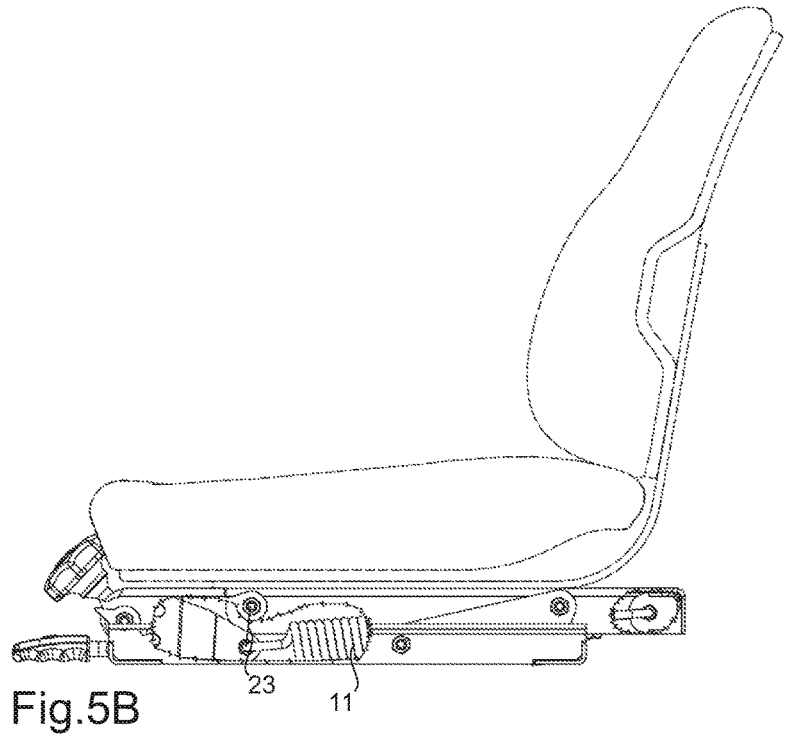
FIG. 5B is a side view of the vehicle seat in a lower end position for a heavy driver.

FIGS. 5A and 5B correspond to an adjustment of the adjustment device 14 for a heavy driver, as illustrated in FIG. 4A, FIG. 5A corresponding to an upper end position and FIG. 5B corresponding to a lower end position.

Figure 5C:
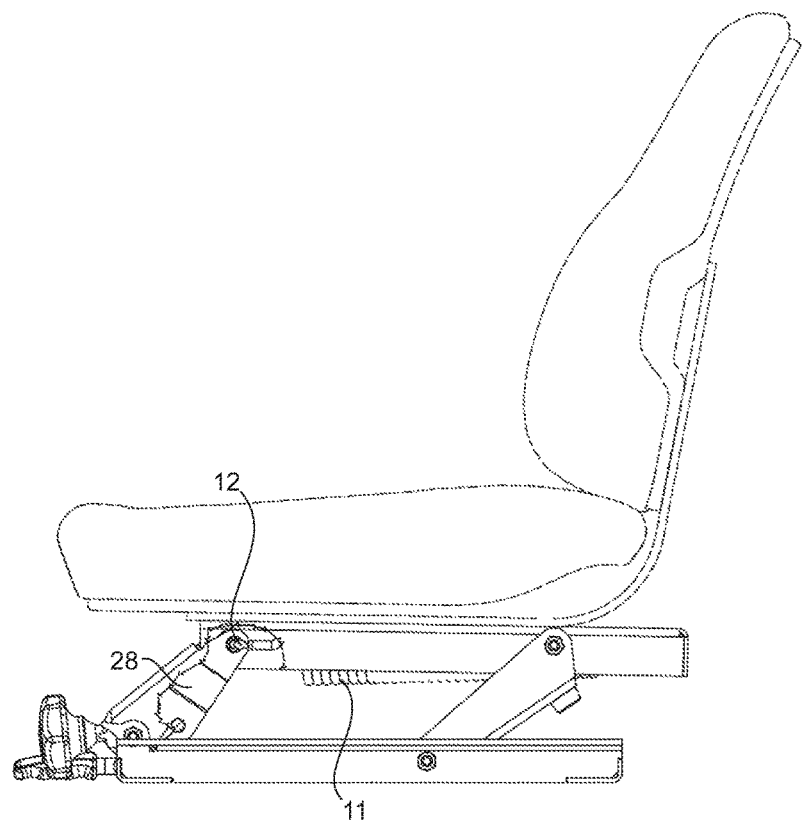
FIG. 5C is a side view of the vehicle seat in an upper end position for a light driver.
Figure 5D:
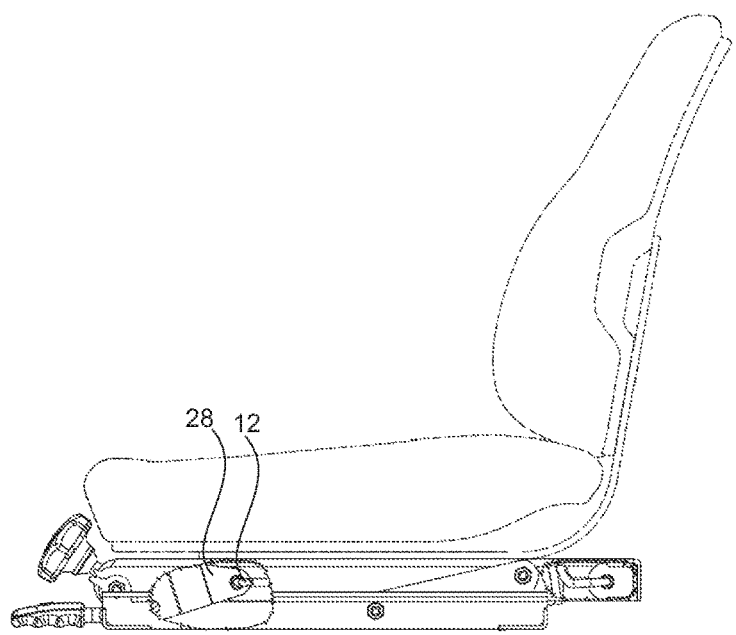
FIG. 5D is a side view of the vehicle seat in a lower end position for a light driver.

FIGS. 5C and 5D correspond to an adjustment of the adjustment device 14 for a light driver, as illustrated in FIG. 4B, FIG. 5C corresponding to an upper end position and FIG. 5D corresponding to a lower end position.

The difference in length of the first lever arm 23 can be particularly clearly seen by comparing FIGS. 5A and 5C. The length of the first lever arm 23 in FIG. 5C is close to zero so that the first tension spring 11 is arranged substantially in parallel with the upper suspension portion 3 in this case.

All of the features disclosed in the application documents are claimed as essential to the invention, whether they are novel individually or in combination over the prior art.

LIST OF REFERENCE NUMERALS 1 suspension device
2 vehicle seat
3 upper suspension portion
4 lower suspension portion
5 first swivel connector
6 second swivel connector
7 first swivel pin
8 second swivel pin
9 third swivel pin
10 fourth swivel pin
11 first tension spring
11' second tension spring
12 first end region of the first tension spring
12' first end region of the second tension spring
13 second end region of the first tension spring
13' second end region of the second tension spring
14 adjustment device
15 actuating lever
16 first distance
17 second distance
18 length adjustment device
19 backrest
20 seat surface
21 seat shell
22 portion extending upwards
22 first lever arm
23' second lever arm
24 torque
25 first torque
26 second torque
27 actuating element axis of rotation
28 adjustment member
29 first axis of rotation
30 second axis of rotation
31 first support element
32 second support element
33 spindle element
34 first spindle bearing
35 second spindle bearing
36 identical portion
37 intermediate portion
37' end portion
38 first adjustment member part
39 second adjustment member part 40 first portion
41 second portion
42 second portion
F resulting force
H vertical direction
L longitudinal direction
B horizontal direction

The invention claimed is:

1. A suspension device for a vehicle seat, comprising:
an upper suspension portion and a lower suspension portion, said suspension portions being connected to one another by a first swivel connector and a second swivel connector, said first swivel connector being arranged on the lower suspension portion in such a way that said first swivel connector can swivel about a first swivel pin, and the second swivel connector being arranged on the lower suspension portion in such a way that said second swivel connector can swivel about a second swivel pin, a first tension spring and a second tension spring being respectively connected to the first swivel connector by a first end region and to the upper suspension portion or the lower suspension portion by a second end region,
wherein the first end region of the first tension spring is attached to the first swivel connector at a first distance, and the first end region of the second tension spring is attached to said first swivel connector at a second distance, the length of the first distance being variable, wherein the first distance between the first end region of the first tension spring and the first swivel connector can be adjusted by an adjustment device, which is connected to the first swivel connector at one end and to the first end region at the other end.

2. The suspension device according to claim 1, wherein the second distance between the first end region of the second tension spring and the first swivel connector remains constant.

3. The suspension device according to claim 1, wherein the adjustment device comprises a first and a second support element, which are rigidly connected to the first swivel connector, a spindle element that can be rotated about a first axis of rotation, said spindle element being connected to a first spindle bearing and a second spindle bearing, said first spindle bearing being connected in a stationary manner to the first and second support element, and said second spindle bearing being connected to an adjustment member that can be rotated about a second axis of rotation, said second axis of rotation being mounted in such a way that it can rotate on the first and second support element, and the first end region of the first tension spring being connected to the adjustment member, and the first end region of the second tension spring being connected to the first support element.

4. The suspension device according to claim 3, wherein the adjustment device can be actuated by an actuating lever, which is connected to the spindle element by rotating the actuating lever about the first axis of rotation, as a result of which the adjustment member can be rotated about the second axis of rotation.

5. The suspension device according to claim 3, wherein the adjustment device can be actuated by an actuating member driven by a motor, said actuating member being connected to the spindle element, by rotating the spindle element about the first axis of rotation, as a result of which the adjustment member can be rotated about the second axis of rotation.

* * * * *